Jan. 5, 1926.
W. A. BONNELL
1,568,131
CABLE BOX ANCHORAGE
Filed Sept. 18, 1922    2 Sheets-Sheet 1
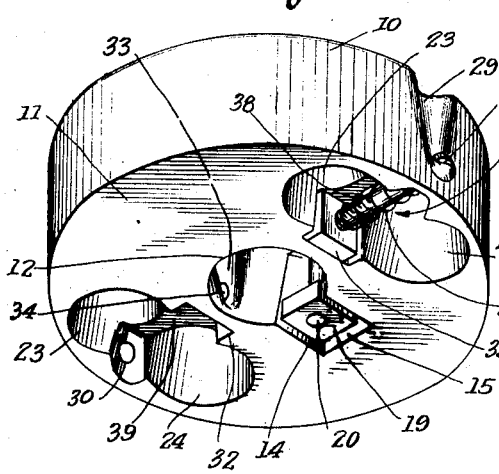
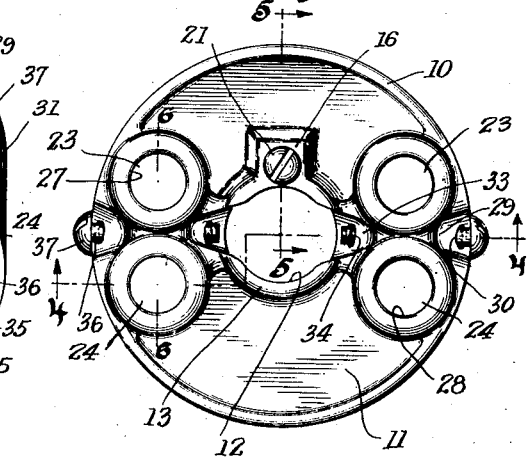
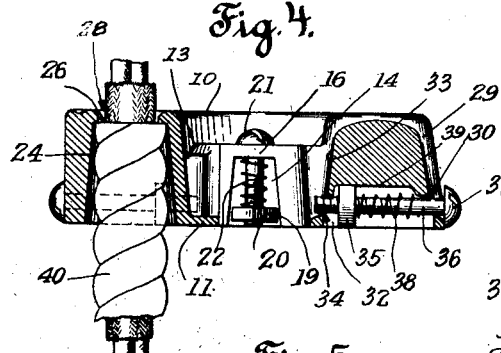
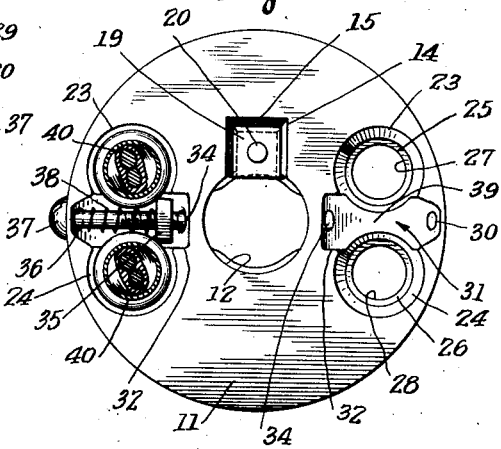
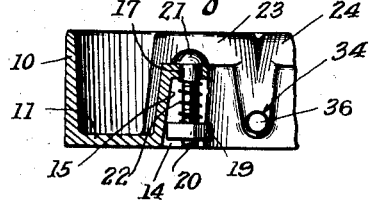
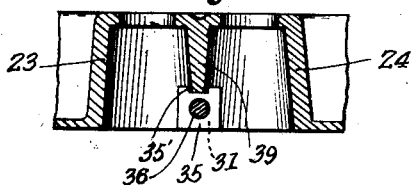
INVENTOR
William A. Bonnell
BY
ATTORNEY Jan. 5, 1926.
W. A. BONNELL
CABLE BOX ANCHORAGE
Filed Sept. 18, 1922
1,568,131
2 Sheets-Sheet 2
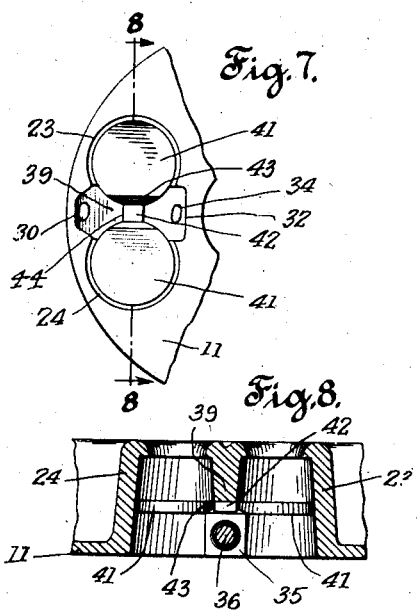
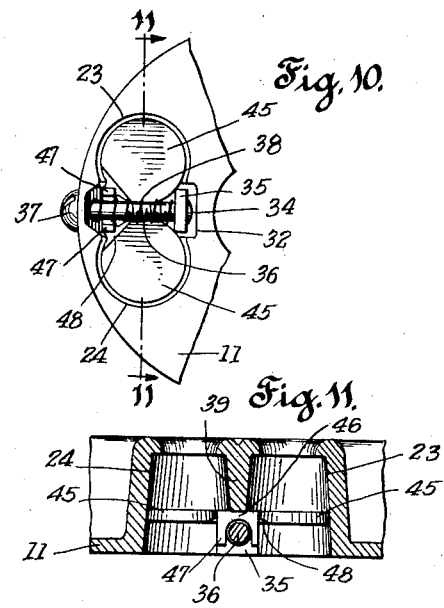
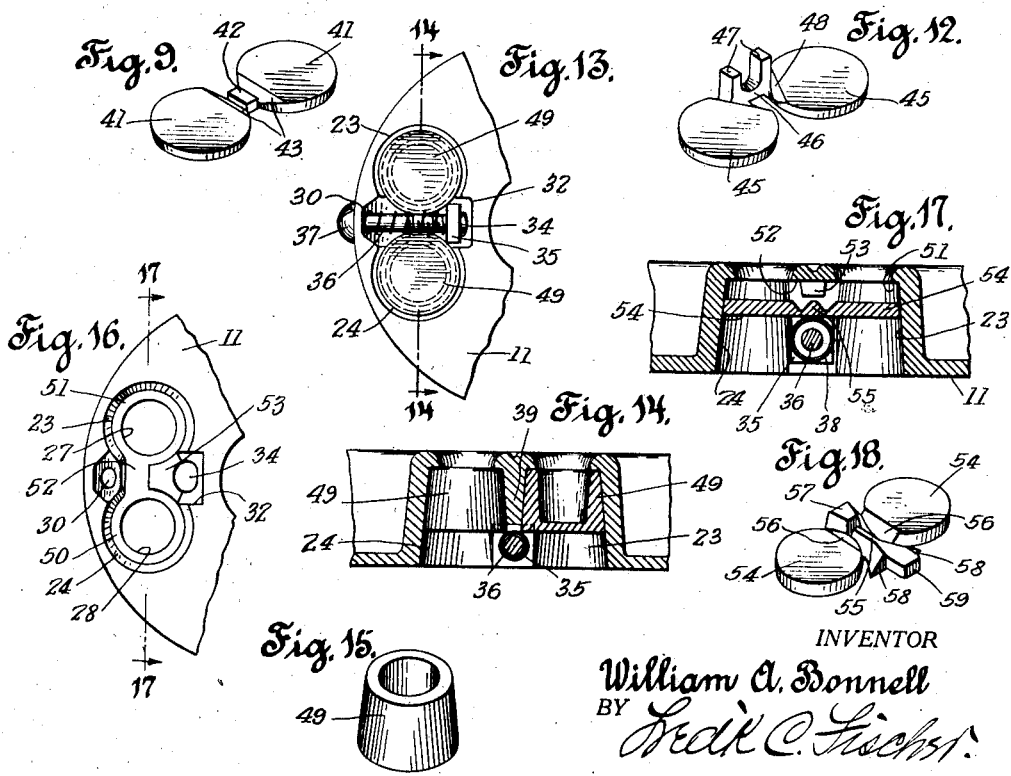
INVENTOR
William A. Bonnell
BY
ATTORNEY Patented Jan. 5, 1926.

1,568,131

UNITED STATES PATENT OFFICE.

WILLIAM A. BONNELL, OF BROOKLYN, NEW YORK.

CABLE-BOX ANCHORAGE.

Application filed September 18, 1922. Serial No. 588,779.

*To all whom it may concern:*

Be it known that I, WILLIAM A. BONNELL, a citizen of the United States, residing at Brooklyn, in the county of Kings and State of New York, have invented certain new and useful Improvements in Cable-Box Anchorages, of which the following is a specification.

The invention relates to devices used in the walls and ceilings of buildings to receive armored cables used as conveyors of electric currents, to which connections are made by conductors leading to service stations within the building as may be required.

Such appliances are usually cylindrical in profile to fit into openings prepared for them and are customarily supported by direct attachment to water or gas pipes on which they are securely engaged.

While any metal may be used in their construction, common cast iron is ordinarily used because of its relatively low cost and for the further reason that preferred shapes can readily be obtained, including the cable receiving recesses and pipe engaging opening.

One of the main objects of the invention is to provide cable box anchorages so designed as to be completely ready for installation and use as received from the foundry, no drilling, tapping or machining of any kind being required.

Another purpose is to produce a cable box having means by which it may be firmly clamped upon a tubular support by a single, readily accessible screw and cooperative nut in conjunction with an inclined element integral with the box.

A further aim is in the provision of means, also actuated by a single screw, for rigidly fastening either a single cable or a pair of the same, when entered into the sockets or recesses arranged for them within the box.

Additional objects are in the production of closure plates suited to be received in the cable sockets when vacant the same being formed with weakening creases to permit easy breakage where desirable and so shaped as to be engaged and maintained in place by securing means used in fastening cables when in their sockets.

These and analogous aims, objects and purposes are attained by the novel design, construction and disposition of parts hereinafter described and shown in the accompanying drawing, forming an essential portion of this disclosure, and in which:—

Figure 1 is a perspective view looking from the inner or back side of a cable box made in accordance with the invention.

Figure 2 is a front plan view of the same.

Figure 3 is a view looking from the other side, one pair of sockets containing clamped cables and the other shown without cables or clamps.

Figure 4 is a transverse sectional view taken on line 4—4 of Fig. 2, showing a cable in one socket and clamping devices for holding the box and cables in fixed position.

Figure 5 is a fragmentary sectional view, taken at a right angle to Figure 4, on line 5—5 of Fig. 2.

Figure 6 is another sectional view taken transversely through a pair of the sockets and showing a slight modification in construction, the section being taken on line 6—6 of Figure 2.

Figure 7 is a fragmentary rear plan view of the box showing one form of frangible closure plates disposed in the sockets when no cables are therein.

Figure 8 is a sectional view of the same the section being taken on line 8—8 of Fig. 7.

Figure 9 is a perspective view of the closure plates in detail.

Figure 10 is a view similar to Fig. 7 but showing an alternative form of closure and method of holding the same in operative position.

Figure 11 is a sectional view taken on line 11—11 of Fig. 10.

Figure 12 is a perspective view of the modified form of closure plate.

Figure 13 is another view like Fig. 10 but showing independent closure in each socket.

Figure 14 is a sectional view taken on line 14—14 of Fig. 13.

Figure 15 is a perspective view of one of the closures in detail.

Figure 16 is still another fragmentary plan view illustrating a further modification in box structure.

Figure 17 is a sectional view taken on line 17—17 of Fig. 16.

Figure 18 is a perspective view of the closure plates used in connection therewith.

In common with the generally accepted type of junction box, the invention, as will be seen in the drawing, consists of a relatively short cylindrical casing, shell or band 10, having at one end a plate head 11, the other end being open.

A central opening 12 is formed in the plate and through the hub 13, which extends from the plate towards the open side and terminates below the plane of the casing wall edge, as best seen in Figures 4 and 5.

Leading outwardly from the hub 13 is a rectangular recess 14, its rear wall 15 being inclined inwardly towards the recess cover element 16 through which is a small hole 17.

The opening 12 is suited to loosely receive a pipe or like support (not shown) and the recess 14 slidably contains a common square nut or block 19 into which is threaded a screw 20, passing freely through the hole 17 the screw head 21 seating on the cover 16.

A coiled compression spring 22, encircling the body of the screw, acts to press the nut 19 outwardly and retain the head against its seat.

When the screw is turned to draw the nut towards its head, one of the sides of the nut rides on the inclined surface 15, thereby forcing the nut inwardly towards the center of the opening 12 and causing its opposite side to engage the support tube in the manner of a wedge, firmly securing the box to the support, but obviously releasing the same upon relaxing the screw, the head of which, being outward, is readily accessible.

At points diametrically opposite and quartering the recess 14 are pairs of sockets or recesses 23 and 24, the same being slightly conical, their larger ends opening through the head 11.

The walls of each pair of sockets, which are closely adjacent and open to each other along their outer ends at their proximate sides, extend outward coincident with the wall of the casing 10 and are formed with inreaching annular floor flanges 25 and 26 surrounding the openings 27 and 28.

Midway between the sockets, the casing 10 is indented, as at 29, mainly for the purpose of facilitating molding, and near the head 11 small holes 30 are formed leading from the outside of the casing to the spaces 31 between each pair of sockets.

At the opposite sides of these spaces rectangular recesses 32 are formed in the head 11 and the hub 13 contains recesses 33 directly opposite, holes 34 communicating between the recesses 32 and 33, these holes being in radial alinement with the holes 30.

Loosely fitting the recesses 32 are square nuts 35 in which are engaged screws 36, their heads 37 seating on the surface of the casing 10 over the indentations 29.

Encircling the screws 36, which may be common stove bolts, are coiled compression springs 38 functioning to press the nuts 35 into their recesses and maintain the heads 37 against their seats, the inner ends of the screws being guided by the holes 34 as will be apparent.

In the modification shown in Figure 6, the ribs 39, partially separating the sockets 23 and 24, below the spaces 31, extend into slots 35' formed in the nuts and prevent the nuts from turning as they are drawn outward by actuating the screws in biting into and clamping the cables 40, as best shown in Figures 3 and 4, firmly securing them in the sockets and it will be evident that a single cable can be held as well as a pair.

Referring now more particularly to the socket closures of which approved types are shown on Sheet 2 of the drawings, and in which Figs. 7, 8 and 9 the preferred form, it will be seen that they consist of a pair of discs 41 integrally joined by a connection 42, the connection being partially severed from the discs by weakening notches 43, all of these elements being cast and unmachined.

It will be understood that the centers of the discs correspond in distance apart with the centers of the sockets and that the diameters of the discs are uniform and suited to freely enter the sockets closing the passage therethrough.

In order to hold the closure in assembled position notches 44 may be formed in the element 39 of the box to receive the connection 42, which is held therein by the spring encircling bolt 36 and nut or block 35.

In the modified form of closure as shown in Figs. 10, 11 and 12 the discs 45 are engaged by a tangential connection 46 provided with forks 47 between which the spring and bolt pass and the peripheries of the discs, if two be used are gripped by the nut 35 when drawn outwardly, and it will be apparent if one of the discs is broken away along the weakening notch 48 and a cable entered, the nut will contact equally with the cable and remaining disc holding them both rigid.

Figs. 13, 14 and 15 illustrate another type of closure consisting of independent and separably operable cups 49 having whole or partial side walls suited to the sockets and extending into position to be engaged by the clamp or binding nut 35 as shown.

An alternative formation of box and closure plate is illustrated in Figs. 16, 17 and 18, in which the box 11 has similar paired recesses 23 and 24 with through openings 27 and 28.

The inreaching flanges 50 and 51, forming the bottoms of the recesses, are joined by a bridge element 52 disposed in the same level plane, and slightly raised thereabove is a flattened seat 53 through which the opening 34 extends and from which rise the walls 32 containing the nut 35, the opposite, outer wall extending from the element 52 to the exterior of the box.

The closure plates 54 are made in pairs to fit the recesses 23 and 24 and connected by an elongated element 55, weakening notches 56 being partially formed in the lower or entry side of the plates or discs and connecting element.

Formed on the front or outer end of the element 55 is a raised lug 57 adapted to rest on the surface 52, the opposite, inner end of the connecting element resting on the seat 53 and is extended laterally, as at 58, to approximately fit the space between the side walls of the recess 32, said element 55 also being provided with an extending tongue 59 to enter the opening 34.

The coiled spring 38 loosely encircling the bolt, together with the nut 35, serve to retain the connecting element 55 in fixed position even if one or both of the discs 54 be broken away and cables entered in the sockets from which the discs are displaced.

From the foregoing it will be seen that the boxes are assembled exactly in the condition they are received from the foundry, with the exception of the usual rough snagging accorded castings, no drilling or machine work being required, therefore producing an exceedingly cheap, but practical and effective form of box, neat and symmetrical in appearance.

Although the foregoing describes the improvements with considerable detail and with respect to certain forms of the invention, it is not desired to be limited to such details since many changes and modifications may well be made without departing from the spirit and scope of the invention in its broadest aspect.

What I claim as new and desire to secure by Letters Patent, is:—

1. A cable box comprising a cast body having a centrally apertured support receiving hub and provided with a plurality of cable receiving sockets, said body being further provided with a plurality of aligned openings communicating with said sockets and centrally apertured hub, said openings being adapted to receive means for securing cables in said sockets and formed in said cast body entirely by casting methods.

2. A cable box comprising a cast body having a centrally apertured support receiving hub and provided with a plurality of cable receiving sockets, the outer and inner portions of said body being indented, said indented portions being provided with aligned openings comunicating with said sockets and centrally apertured hub, said openings and indented portions being formed in said cast body entirely by casting methods and adapted to receive means for securing cables in said sockets.

3. A cable box comprising a cylindrical cast body having a closed side, a central hub projecting inwardly from said closed side, securing means associated with said hub, pairs of cable receiving sockets formed in said body, said hub having recesses extending outwardly towards the median plane of said sockets in the open side of said body, there being recesses in the periphery of said body extending inwardly at points opposite hub recess in the same side of said body, oppositely disposed recesses in the closed side of said body extending over the first named recesses, the mentioned recesses being in communication, nuts moveable in the inner recesses of the closed side and screws passing through the communicating openings between the recesses whereby said nuts may be drawn into engagement with cables disposed in said sockets.

In testimony whereof I have signed my name to this specification, this 14th day of September, 1922.

WILLIAM A. BONNELL.